Patented Nov. 17, 1931

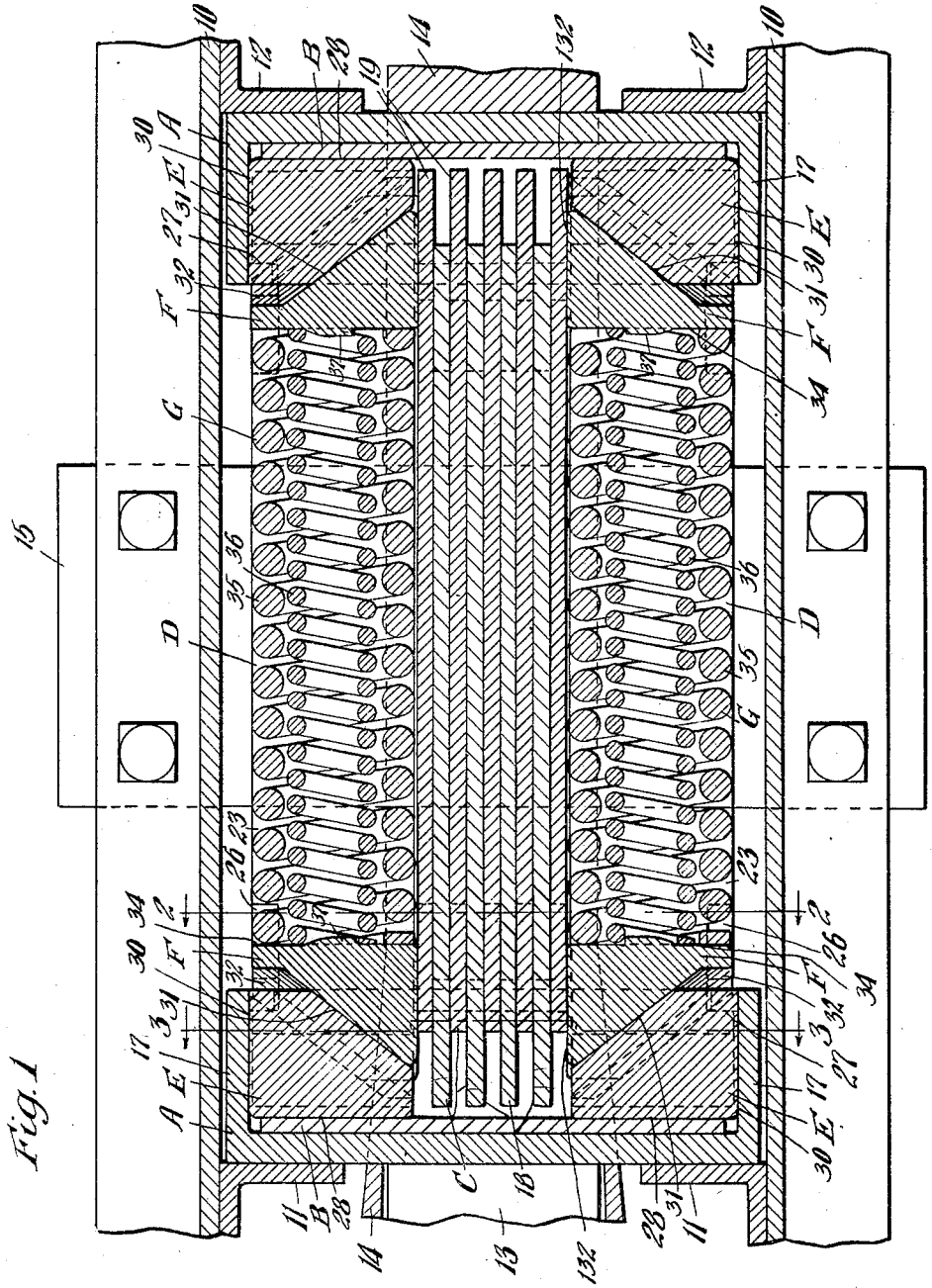

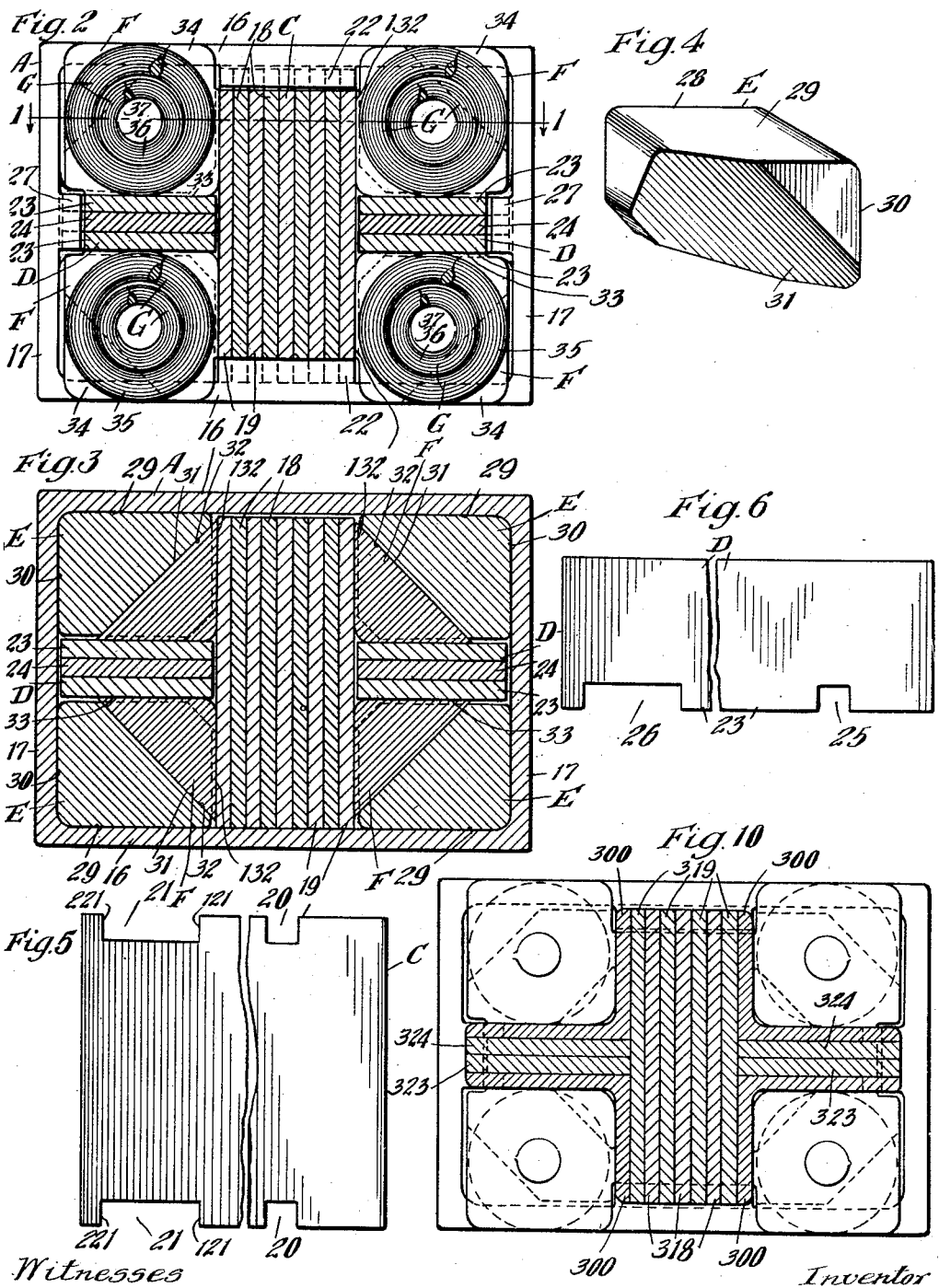

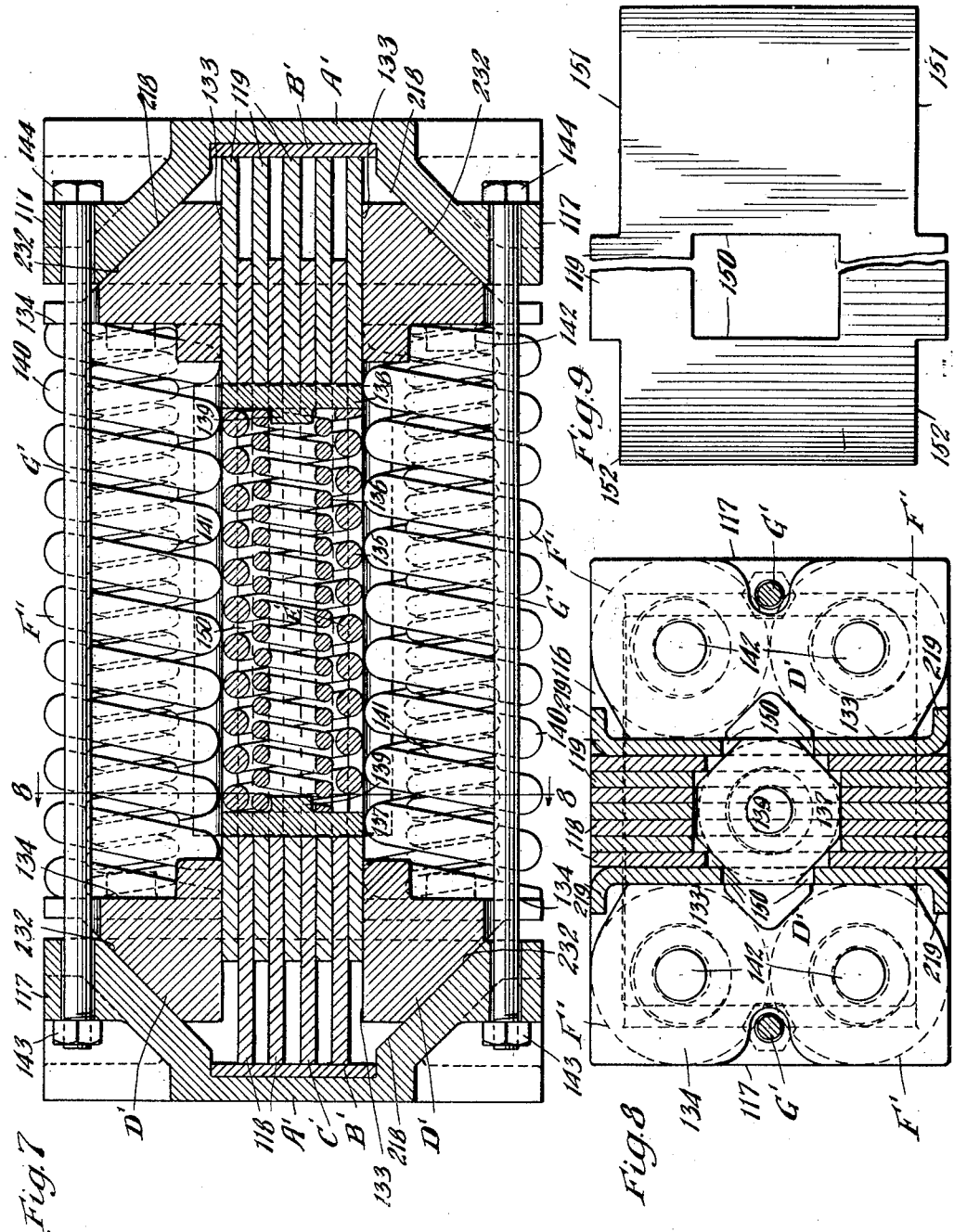

1,831,909

UNITED STATES PATENT OFFICE

STACY B. HASELTINE, OF CHICAGO, ILLINOIS, ASSIGNOR, BY MESNE ASSIGNMENTS, TO W. H. MINER, INC., A CORPORATION OF DELAWARE

FRICTION SHOCK ABSORBING MECHANISM

Application filed April 19, 1923. Serial No. 633,047.

This invention relates to improvements in friction shock absorbing mechanisms.

One object of the invention is to provide a friction shock absorbing mechanism, particularly adapted for use in connection with railway draft riggings, wherein high capacity is had, due to large frictional areas.

A further object of the invention is to provide a friction shock absorbing mechanism of the intercalated friction plate type, wherein the plates serve as the column load sustaining means, when the gear is fully compressed.

A still further object of the invention is to provide a shock absorbing mechanism, including a plurality of intercalated friction plates, wherein the plates are arranged in two sets, with the plates of one set arranged at right angles to the plates of the other set and wherein four diagonally disposed wedging systems are arranged to co-operate with the plates.

Other objects and advantages of the invention will more clearly appear from the description and claims hereinafter following.

In the drawings forming a part of this specification, Figure 1 is a horizontal longitudinal sectional view of a portion of a draft rigging corresponding substantially to the line 1—1 of Figure 2 showing my improved shock absorbing mechanism in connection therewith. Figure 2 is a vertical transverse sectional view, corresponding substantially to the line 2—2 of Figure 1. Figure 3 is a transverse sectional view, corresponding substantially to the line 3—3 of Figure 1. Figure 4 is a detailed perspective view of one of the wedge blocks. Figure 5 is a side elevational view partly broken away of one of the friction plates. Figure 6 is a side elevational view, partly broken away, of a different friction plate. Figure 7 is a central horizontal longitudinal sectional view similar to Figure 1, showing a modified form of the invention. Figure 8 is a transverse vertical sectional view corresponding substantially to the line 8—8 of Figure 7. Figure 9 is a side elevational view partly broken away, of one of the friction plates used in the modified form of the invention shown in Figure 7. And Figure 10 is a transverse, vertical sectional view, of a further modification, involving an arrangement similar to that shown in Figures 1 to 6 inclusive, but having right angular plates interposed between each wedge system and the adjacent groups of plates.

In said drawings, 10—10 indicate channel shape draft sills of a railway car under frame, to the inner faces of which are secured front stop lugs 11 and rear stop lugs 12. A portion of the draw-bar is shown at 13, to which is attached a hooded yoke 14. The shock absorbing mechanism proper, including front and rear followers, is disposed within the yoke 14, and the movable parts of the draft riggings are supported by a detachable saddle plate 15.

The preferred form of the improved shock absorbing mechanism proper, as clearly shown in Figures 1 to 6 inclusive, comprises, broadly, front and rear followers A—A; front and rear follower wear plates B—B; a central group of vertically arranged friction plates C; two groups of horizontally arranged friction plates D—D; front and rear wedge blocks E—E; front and rear friction shoes F—F; and spring resistance elements G—G.

The front and rear followers A are of similar construction, and co-act respectively with the front and rear stop lugs. As clearly shown, each of the followers A is of rectangular form and is provided with spaced, horizontal, inwardly projecting top and bottom flanges 16—16 and vertically arranged, spaced longitudinally projecting side flanges 17—17. To prevent wear of the inner faces of the followers A, each follower is provided with a hardened plate B abutting the inner face thereof.

The group of friction plates C is longitudinally arranged between the followers A, and consists of four plates 18 and five plates 19, the plates 18 and 19 being alternated with the plates 19 arranged outermost and in contact with the inner faces of the adjacent friction shoes F. The plates 18 and 19 are of like construction and, as best shown in Figure 5, each of the plates is provided with upper and lower short slots 20 near one end thereof and upper and lower relatively longer slots 21 near the other end, the slots 20 being spaced further from the adjacent end of the plate than the slots 21. As clearly shown in Figure 1, the plates 18 and 19 are reversely arranged, with the slots 20 of the plates 18 co-acting with retaining ribs 22 projecting from the top and bottom walls 16 of the front follower A, and the slots 20 of the plates 19, coacting with similar ribs 22 projecting from the top and bottom walls 16 of the rear follower A. The slots 21 in the plates 18 and 19 are provided so that the plates will clear the ribs 22, these slots being of sufficient length to prevent engagement of the inner end walls 121 thereof with the ribs 22, in extreme positions of the plates under a compression stroke. The slots 20, as clearly shown in Figure 1, are of a length somewhat greater than the width of the ribs 22, whereby relative movements of the plates and the follower carrying the same, is permitted during compression of the mechanism, so that the wear plate B of said follower may engage with the adjacent ends of the plates carried thereby. During the separating movement of the followers A, the ribs 22 are adapted to co-act with the outer end walls of the slots 20 and restore the plates to normal position with the adjacent ends thereof spaced a short distance from the inner faces of the wear plates B as clearly shown in Figure 1. In the normal position of the parts, the outer end walls 221 of slots 21 of the plates C will be in contact with inside vertical faces or ribs 22 of follower A.

The friction plates D are arranged in two groups, at right angles to the group of plates C, and disposed on opposite sides of the latter. As herein shown, the groups of plates D each comprise two plates 23 and one plate 24, with the plates 23 of each group arranged outermost and in contact with the adjacent faces of the wedge friction shoes F. The plates 23 and 24 are of similar construction and, as best shown in Figure 6, each plate is formed with a short slot 25 in the outer edge at one end thereof and a relatively longer slot 26 in the outer edge, at the other end thereof. The slots 25 of the plates 23 are adapted to co-act with the ribs 27 projecting inwardly from the opposite side walls 17 of one of the followers A, while the slots 25 of the plates 24 are adapted to co-act with similar ribs 27 projecting from the walls 17 of the other follower. The ribs 27 co-act with the slots of the plates in a manner similar to that described in connection with the plates C, and the elongated slots 26 permit the opposite ends of the plates to properly clear the ribs and limit outward movement of opposite follower, in a manner similar to the slots 21 of the plates C.

The wedge blocks E are eight in number, four being associated with each follower A, one block E being located at each corner of each of the followers A. Each of the wedge blocks E, as clearly shown in Figure 4, is provided with an outer flat face 28 adapted to co-act with the inner face of one of the wear plates B, two flat side faces 29 and 30 adapted to co-act respectively with the walls 16 and 17 of one of the followers A, and a flat wedge face 31 extending in a plane at an angle to the planes of both sets of friction plates, in other words, disposed diagonal with reference to the longitudinal, vertical and transverse horizontal axes of the mechanism.

The friction shoes F are also eight in number, four being associated with each of the followers and adapted to co-operate with the corresponding wedge blocks E. Each of the friction shoes F is provided with a flat wedge face 32 adapted to co-act with the wedge face 31 of the corresponding wedge block E and correspondingly inclined with said wedge face 31; a pair of flat side faces 132 and 33 adapted to co-act respectively with the friction plates 19 of the group C and the friction plates 23 of one of the groups of plates D; and a flat transverse face 34 adapted to form an abutment for the spring resistance element D.

The spring resistance elements G are four in number, located in the corners between the groups of friction plates and are interposed between a pair of friction shoes F. Each of the spring resistance elements G comprises a relatively heavy outer coil 35 and a relatively lighter inner coil 36, the coil 36 being held in centered position by means of lugs 37 projecting from the faces 34 of the friction shoes F.

In the operation of my improved shock absorbing mechanism, as shown in Figures 1 to 6 inclusive, assuming that the front follower A is being moved rearwardly toward the rear follower during buff, a wedging action will be set up between the wedges E and the friction shoes F, at both ends of mechanism, thereby placing the groups of friction plates C and D under compression and augmenting the frictional resistance between the plates. During the further inward movement of the front follower A the same will approach the outer ends of the nearest adjacent friction plates of the groups C and D, and the opposite ends of the remaining plates of the groups C and D will gradually approach the rear follower A, until the same are engaged by the respective followers and moved relatively to each other thereby. This relative movement of the plates will continue until the gear is fully compressed. When the gear is thus fully compressed, all of the plates will abut both followers whereby, the plates form a column-load-sustaining means transmitting the pressure directly from the front follower to the rear follower.

During the draft action of the shock absorbing mechanism, the operation is similar to that just described, the only difference being that the rear follower A is moved relatively to the front follower.

Upon discontinuance of the pressure upon the shock absorbing mechanism, the wedge blocks E will be permitted to move away from the friction shoes F, thereby effecting a decrease of the pressure on the friction plates prior to any relative movement thereof. After the wedging pressure has been thus relieved the ribs 22 on the front and rear followers will engage with the outer end walls of the slots 20 and 25, respectively, of the groups of friction plates C and D, the respectively alternating plates of each group being thereby drawn in opposite directions longitudinally upon the further relative longitudinal separation of the co-engaging followers as impelled by the reactive effort of the several springs, thus returning them to normal position with the ends thereof spaced from the inner walls of the front and rear followers, as clearly shown in Figure 1, further longitudinal separation of the various parts of the device being prevented by the inter-engagement at opposite ends of the device of ribs 22 and ribs 27 of followers A with the adjacent outer end walls of slots 20 and 21 and slots 25 and 26 respectively of the groups of plates C and D, thus serving to hold device at desired overall length, with initial compression on springs.

The modification shown in Figures 7, 8 and 9 inclusive, comprises, front and rear followers A'—A'; follower wear plate B'—B'; a group of friction plates C'; wedge friction shoes D'; a central spring resistance element E'; a plurality of twin arranged spring resistance elements F'; and retainer bolts G'.

The front and rear followers A' are of similar construction, and are provided with horizontally extending upper and lower walls 116 and vertically extending side walls 117—117. The inner faces 218 of the side walls converge from the outer or open end to the closed end of the followers A'; and are adapted to co-act with the wedge friction shoes D'. Each of the followers A' is provided with a hardened follower wear plate B' abutting the inner face of the follower.

The group of friction plates C' is longitudinally arranged, and is interposed between the front and rear followers A'. As clearly shown in Figure 7, the group of friction plates C' comprises four plates 118 and five plates 119, the plates 118 and 119 being alternated, with a pair of plates 119 arranged outermost at opposite sides of the group and in contact with the adjacent friction shoes D'. The outermost plates 119 of the group of plates are preferably provided with laterally projecting top and bottom flanges 219, to give greater stiffness to the plates and resist outward buckling tendency. The plates 118 and 119 are of similar construction and, as best shown in Figure 9, each is formed with a central opening 150 adapted to accommodate the central spring resistance element E'. The plates have their upper and lower edges cut away at opposite ends thereof as shown at 151 and 152, thereby reducing the height of the plates at opposite ends so that they may be properly accommodated between the top and bottom walls 116 of the front and rear followers A'. Upon reference to Figure 9, it will be noted that the cut away portions 151 are of greater extent than the cut away portions 152, for a purpose to be more clearly explained later, the cut away portions 151 being located at the forward ends of the plates 118 and the cut away portions 151 of the plates 119 being at the rear ends of said plates, whereby the outer ends of the respective plates 118 and 119 are adapted to be accommodated between the upper and lower walls 116 of the front and rear followers, so that the front ends of plates 118 and the rear ends of the plates 119 will always be in abutment with the inner faces of the respective follower wear plates B'. The cut away portions 152 of the plates 118 and 119 are of such a length that the adjacent ends will be properly accommodated between the upper and lower walls of the front and rear followers A', when the gear is fully compressed, so that the rear ends of plates 118 and the front ends of plates 119 may be brought into abutment with the follower wear plates B'. As clearly shown in Fig. 8, the innermost plates 118 and 119 have the openings 150 of greater height than the outer plates 118 and 119 to properly accommodate the central spring resistance therein and hold the same in assembled relation with the plates.

The friction wedge shoes D' are four in number, being arranged in pairs at opposite ends of the mechanism and on opposite sides of the group of friction plates C'. Each of the friction wedge shoes D' is provided with a wedge face 232 adapted to co-act with the corresponding wedge face of one of the followers A' a flat side face 133 adapted to co-act with the outer face of one of the outermost plates 119 of the group of plates C', and a flat transverse face 134 adapted to form an abutment for the end of one of the spring resistance element F'.

The central spring resistance element E' comprises a relatively heavy outer coiled spring 135 and a relatively lighter inner coiled spring 136. The springs 135 and 136 are interposed preferably under initial compression between front and rear spring followers 137 and 138, respectively, adapted to abut the front and rear walls of the recesses 150 of the plates 118 and 119. As clearly shown in Figure 7, each of the spring followers 137 and 138 is provided with an inwardly projecting boss 139 adapted to hold the spring 135 in centered position.

The spring resistance elements F′ comprise two pairs of twin arranged springs, located at opposite sides of the group of friction plates C′. Each of the spring resistance elements F′ comprises an outer, relatively heavy coiled spring 140 and a relatively lighter, inner coiled spring 141. The opposite ends of the springs 140 and 141 are adapted to abut the rear faces 134 of a pair of front and rear friction shoes D′, each of the friction shoes D′ having a pair of spaced lugs 142 inwardly projecting from the rear face thereof co-acting with the springs 141 of each pair of twin arranged springs, to properly center the same and hold the springs in assembled relation with the mechanism.

The retainer bolts G′ are two in number and are arranged at opposite sides of the front and rear followers A′, and are adapted to hold the parts of the gear in assembled relation and under initial compression. Each of the retainer bolts passes between the upper and lower spring resistance elements F′ of each pair and through alined recesses in the front and rear followers and the friction wedge shoes D′. The bolts are anchored to the front and rear followers, respectively, by the nuts 143 and the heads 144.

In the operation of the modified form of my improved shock absorbing mechanism, as illustrated in Figures 7, 8 and 9, assuming that the front follower A′ is being moved rearwardly toward the rear follower during buff, a wedging action will be set up between the faces 218 on the front and rear followers and the wedge friction shoes D′, forcing the wedge shoes into tight engagement with the group of friction plates C′, thereby putting the friction plates under pressure and augmenting frictional resistance between the same. During this inward movement of the front follower A′, the friction plates 118 will be moved rearwardly therewith, relatively to the friction plates 119, which are held in relatively fixed position by abutment with the rear follower A′, thereby placing the central spring resistance element E′ under further compression. As the plates 118 move rearwardly with the front follower A′, the rear end walls of the recesses 150 thereof will be moved out of contact and away from the spring follower 138, and the front end walls of the recesses 150 will act to move the front spring follower 137 away from the front end walls of the recesses in the plates 119. During the further inward movement of the follower A′, the rear ends of the plates 118 will gradually approach the rear follower A′ and the front follower A′ will gradually approach the outer ends of the plates 119. This relative approaching movement will continue until the gear has been fully compressed, when the front ends of the plates 119 and the rear ends of the plates 118 will be brought into abutment with the front and rear followers respectively, whereupon, the entire group of friction plates C′ will act as a solid abutment, forming a column-load-sustaining means transmitting the ultimate load directly from the front follower to the rear follower.

Upon discontinuance of the pressure on the shock absorbing mechanism, followers A′ will readily relieve themselves from close wedging engagement with shoes D′, by reason of the relatively large included angle between the bevelled side walls of the former, whereupon reactive effort of the springs F′ oppositely exerted against shoes D′ will readily restore these members and followers A′ to normal free relative position. As soon as the wedging pressure on the friction plates becomes thus sufficiently reduced, the friction plates will be restored to normal free position by the expansion of the central spring resistance E′, the front spring follower 137 returning the plates 118 to normal position and the rear spring follower 138 holding the plates 119 relatively stationary by engagement with the end walls of the recesses 150 of the respective plates. This movement will continue until the end walls of the recesses in all the plates are brought into alinement, at which time all the various parts of the device will then stand in original normal free position.

The modification shown in Figure 10 is in all respects similar to the form of the invention shown in Figures 1 to 6 inclusive, with the exception that the right angular plates are interposed between each of the wedge systems and the adjacent groups of plates, the groups of plates, wedge systems and other parts being similarily arranged. As shown in Figure 10 the longitudinally disposed group of center plates corresponding to the plates C comprises three plates 318 and four plates 319 corresponding in form and arrangement to the plates 18 and 19 shown in Figures 1 to 6 inclusive, and the two groups of plates, arranged at right angles to the center group of plates and disposed on opposite sides thereof and corresponding to the groups D each comprising a pair of plates 323 and 324 corresponding in form and arrangement to the plates 23 and 24 respectively. The right angular plates 300 are four in number, extend longitudinally of the mechanism and one of the same is interposed between each corner wedge system and the adjacent group of plates. The outermost plates 319 of the centrally disposed group of plates being adapted to abut the vertically disposed arms of the respective plates 300 and the upper and lower plates 324 and 323 respectively of the two side groups of plates being adapted to abut the horizontally disposed arms of the respective plates 300.

The operation of the mechanism shown in Figure 10 is in all respects similar to that of the preferred form shown in Figures 1 to 6 inclusive and therefore a detailed description thereof is not deemed necessary.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with front and rear followers; of a plurality of longitudinally arranged, intercalated friction plates interposed between said followers, said plates being adapted for relative movement upon relative movement of said followers, and forming a solid column sustaining the load when the gear is under full compression; and a lateral, wedge pressure-creating means interposed between said followers and co-acting with said plates; and a spring resistance co-operating with said wedge pressure creating means.

2. In a friction shock absorbing mechanism, the combination with a plurality of longitudinally arranged, intercalated friction plates; of lateral pressure creating means co-operating with said plates; follower members, relatively movable toward each other and adapted to effect relative movement of said plates and co-acting with said pressure creating means during compression of the mechanism, said followers engaging the opposite ends of all of said plates, when the mechanism is fully compressed said plates serving as a column-load-sustaining means; and means for yieldingly opposing relative movement of said followers.

3. In a friction shock absorbing mechanism, the combination with front and rear follower acting means; of a spring resistance interposed between said followers; a column-load-sustaining means interposed between said followers, said last named means consisting of a plurality of relatively movable intercalated friction plates; and lateral pressure creating means co-operating with said plates and adapted to be actuated upon relative movement of said followers.

4. In a friction shock absorbing mechanism, the combination with front and rear follower-acting means; of a plurality of longitudinally arranged, intercalated friction plates interposed between said means and adapted to be moved relatively to each other upon relative movement of said follower acting means, said plates being of such a length that the opposite ends of each plate will abut with the front and rear follower acting means, respectively, when the gear is fully compressed; a lateral, wedge-pressure-creating means interposed between said first named means and co-operating with said plates; and a spring resistance co-acting with said wedge pressure-creating means.

5. In a friction shock absorbing mechanism, the combination with front and rear followers, relatively movable toward each other; of a spring resistance opposing relative movement of said followers; lateral wedge-pressure-creating means interposed between said followers and disposed at opposite sides of the mechanism; and a plurality of longitudinally arranged, intercalated friction plates extending between said followers and adapted to be engaged and moved thereby, said plates being interposed between said means and co-operating with both followers to positively limit the relative approach of the followers when the gear is fully compressed.

6. In a friction shock absorbing mechanism, the combination with front and rear followers movable toward each other; of a spring resistance co-operating with said followers; a plurality of longitudinally arranged, relatively movable friction plates interposed between said followers and adapted to be engaged and moved by the latter, certain of said plates being arranged at right angles to the remaining plates; and wedge pressure-creating means interposed between said followers and co-acting with said plates.

7. In a friction shock absorbing mechanism, the combination with relatively movable front and rear followers; of a spring resistance opposing relative movement of said followers; a plurality of sets of longitudinally arranged, friction plates interposed between said followers, one of said sets of plates being arranged at right angles to another set and projecting laterally beyond the planes of the opposite sides of said last named set; and a wedge pressure-creating means interposed between said followers and co-acting with said sets of plates.

8. In a friction shock absorbing mechanism, the combination with front and rear followers relatively movable toward each other; of a spring resistance for said followers; a plurality of sets of longitudinally extending relatively movable friction plates interposed between said followers, two of said sets of plates being disposed in planes at right angles to the remaining plates, said last named set of plates being disposed between the said two sets; and wedge pressure-creating means interposed between said followers and co-acting with said sets of plates.

9. In a friction shock absorbing mechanism, the combination with front and rear followers; of a spring resistance; a plurality of sets of intercalated friction plates interposed between said followers, the plates of one of said sets being arranged in vertical planes at right angles to the plates of the remaining sets, said last named sets being disposed on opposite sides of said first named set; a wedge pressure-creating means interposed between said followers and co-acting with said sets of plates; and co-acting means on said followers and plates for returning the latter to normal position with the ends thereof spaced from said followers.

10. In a friction shock absorbing mechanism, the combination with relatively movable front and rear pressure transmitting members; of a plurality of longitudinally arranged, intercalated friction plates interposed between said members, said plates being adapted for relative movement upon relative movement of said members, means for placing said plates under lateral pressure including a plurality of wedge systems interposed between said members and co-acting with said plates, said wedge systems being disposed diagonally on opposite sides of said plates; and spring means opposing movement of said systems and plates.

11. In a friction shock absorbing mechanism, the combination with front and rear followers; of a spring resistance; a plurality of longitudinally arranged, intercalated friction plates, interposed between said followers, said plates being adapted for relative movement upon relative movement of said followers; a plurality of wedge systems interposed between said followers and co-acting with said plates, said systems including a plurality of wedges and wedge shoes having the co-operating faces thereof angularly disposed with reference to each of a pair of planes intersecting at right angles and both co-inciding with the longitudinal axis of the gear, movement of said shoes being opposed by said spring resistance; and means on said followers opposing lateral outward movement of said wedges.

12. In a friction shock absorbing mechanism, the combination with front and rear followers relatively movable toward each other; of a plurality of longitudinally arranged, relatively movable friction plates interposed between said followers and adapted to be moved thereby, certain of said plates being arranged at right angles to the remaining plates; a plurality of sets of wedges and wedge shoes co-acting with said plates, said wedges and wedge shoes having the co-operating faces thereof disposed angularly with reference to all of said plates; means on said followers limiting lateral outward movement of said wedges; and means yieldingly opposing movement of said shoes.

13. In a friction shock absorbing mechanism, the combination with front and rear followers relatively movable toward and from each other; of a plurality of sets of longitudinally arranged, relatively movable friction plates interposed between said followers, one of said sets of plates being arranged at right angles to the remaining sets; a plurality of wedge systems at opposite ends of the mechanism, interposed between said followers, each system being adapted to co-act with a plurality of said sets of plates; means for preventing lateral outward movement of said wedge systems; and spring resistance means interposed between the wedge systems at opposite ends of the mechanism.

14. In a friction shock absorbing mechanism, the combination with front and rear followers, said followers being relatively movable; of three sets of longitudinally arranged, relatively movable intercalated friction plates interposed between said followers, with two of said sets of plates arranged at opposite sides of and at right angles to the third set of plates; a plurality of wedge systems interposed between the followers, each of said wedge systems co-acting with said last named sets of plates and one of the sets at right angles thereto; spring resistance means co-operating with said wedge systems; and means opposing lateral movement of said systems away from said plates.

15. In a friction shock absorbing mechanism, the combination with rectangular front and rear followers relatively movable toward each other; of a plurality of longitudinally arranged relatively movable intercalated friction plates interposed between said followers, certain of said plates being arranged at right angles to the remaining plates; a plurality of wedge elements engaging each follower and held against lateral movement away from said plates; a plurality of friction shoes co-acting with said friction plates, each of said shoes being adapted to co-operate with one of said wedge elements; and spring resistance means opposing movement of said shoes.

16. In a friction shock absorbing mechanism, the combination with front and rear followers relatively movable toward and from each other; of a plurality of longitudinally arranged, intercalated, relatively movable friction plates interposed between said followers, certain of said plates being arranged at right angles to the remaining plates; a wedge-pressure creating means interposed between said followers and co-acting with said plates; and means for restoring all of said plates to normal position, with the ends thereof spaced from said followers.

17. In a friction shock absorbing mechanism, the combination with a plurality of sets of longitudinally arranged, relatively movable intercalated, friction plates, the plates of one of said sets being arranged between and angularly disposed with reference to the plates of the remaining sets; of a spring resistance; lateral pressure creating means cooperating with said plates; a spring resistance cooperating with said means; and relatively movable end followers co-operating with said plates and pressure creating means.

18. In a friction shock absorbing mechanism, the combination with front and rear followers relatively movable toward and away from each other; of a plurality of sets of intercalated, relatively movable friction plates, the plates composing different sets being disposed in planes which intersect; a spring resistance interposed between said followers; and pressure-creating means comprising a plurality of wedge systems co-acting with said plates.

19. In a friction shock absorbing mechanism, the combination with relatively movable front and rear followers; of a spring resistance between said followers; a plurality of sets of longitudinally arranged, relatively movable friction plates, median planes, projected, of all sets radiating from a common line and all of the plates of each set being disposed in parallel relation; and wedge-pressure-creating means interposed between said followers and co-acting with said sets of plates.

20. In a friction shock absorbing mechanism, the combination with relatively movable front and rear followers; of a spring resistance for said followers; a plurality of longitudinally arranged relatively movable friction plates interposed between said followers, certain of said plates being arranged at right angles to the remaining plates; wedge-pressure-creating means interposed between the followers and co-operating with the plates; and right angular plates interposed between the wedge-pressure-creating means and said plates.

21. In a friction shock absorbing mechanism, the combination with front and rear followers relatively movable toward and away from each other; of a plurality of sets of longitudinally arranged relatively movable friction plates interposed between said followers, one of said sets of plates being angularly disposed with reference to the remaining sets; a plurality of wedge systems carried by each follower and held against lateral outward movement thereby, each system co-acting with a plurality of said sets of plates; a spring resistance co-operating with said systems; and angular plates interposed between each wedge system and the sets of plates co-acting therewith.

22. In a friction shock absorbing mechanism, the combination with rectangular front and rear follower shells, said shells being relatively movable; of a plurality of longitudinally arranged relatively movable intercalated friction plates interposed between said followers, certain of said plates being arranged at right angles to the remaining plates; a plurality of wedge elements within each follower shell and bearing on the walls thereof, said wedge elements being located at the corners of said followers; a plurality of friction shoes co-acting with said friction plates, each of said shoes being adapted to co-operate with one of said wedges; spring resistance means opposing movement of said shoes; and angular plates interposed between each of said shoes and the co-acting friction plates.

23. In a friction shock absorbing mechanism, the combination with front and rear followers; of a spring resistance; a plurality of longitudinally arranged intercalated friction plates interposed between said followers, said plates being adapted for relative movement upon relative movement of said followers, and forming a solid column sustaining the load when the gear is under full compression; co-acting means on said plates and followers for limiting the relative outward movement of the latter; and wedge pressure creating means interposed between said followers and co-acting with said plates.

24. In a friction shock absorbing mechanism, the combination with front and rear followers; of a spring resistance; a plurality of longitudinally arranged intercalated friction plates interposed between said followers, said plates being adapted for relative movement upon relative movement of said followers; co-acting means on said followers and plates for limiting the relative outward movement of said followers; and wedge pressure creating means co-acting with said plates.

25. In a friction shock absorbing mechanism, the combination with a group of longitudinally disposed, relatively movable intercalated friction plates; of wedge friction shoes at the opposite ends of the mechanism, said shoes being disposed on opposite sides of said group of plates; spring resistance means interposed between the shoes at the opposite ends of the mechanism; wedge pressure transmitting means at opposite ends of the mechanism co-operating with said shoes.

26. In a friction shock absorbing mechanism, the combination with front and rear follower acting means, each having wedge means movable therewith, each wedge means having a pair of opposed relatively fixed wedge faces diverging inwardly of the mechanism; front and rear pairs of wedge friction shoes, each shoe having a wedge face and a friction surface, the wedge face of each shoe co-operating with one of the wedge faces of said wedge means; a spring resistance means interposed between said front and rear pairs of shoes; and a group of relatively movable, intercalated friction plates interposed between the shoes of the front and rear pairs and co-operating with the friction surfaces thereof.

27. In a friction shock absorbing mechanism, the combination with a group of longitudinaly disposed, relatively movable friction plates; wedge pressure transmitting systems at opposite ends of the mechanism, each including friction shoes being on the opposite sides of said groups of plates; and means exterior to the group of plates for yieldingly resisting relative movement of said shoes.

28. In a friction shock absorbing mechanism, the combination with a group of intercalated, relatively movable friction plates; of spring resistance means disposed about said group; friction wedge shoes bearing on the opposite sides of said group of plates, said shoes being arranged in sets at opposite ends of the plates; relatively movable followers adapted to effect relative movement of said plates, said followers having laterally acting wedge means thereon; and means actuated by the expansion of said spring resistance during release for effecting restoration of the plates to normal position.

29. In a friction shock absorbing mechanism, the combination with a group of relatively, longitudinally movable friction plates; front and rear followers, relatively movable toward each other, said followers upon relative approach thereof being arranged to engage and move said plates relatively to each other; lateral wedge pressure transmitting members bearing on each follower; wedge shoes co-operating with each wedge pressure transmitting member, said shoes being disposed on opposite sides of said group of plates; and a spring resistance means interposed between said shoes.

30. In a friction shock absorbing mechanism, the combination with front and rear followers; lateral wedge pressure transmitting means carried by each follower; a pair of friction wedge shoes co-operating with each follower, said shoes being arranged on opposite sides of the mechanism; means yieldingly resisting relative movement of said shoes; and a group of vertically disposed, longitudinally arranged, relatively movable, intercalated friction plates disposed between the shoes at the opposite sides of the mechanism and embraced by said last named means.

31. In a friction shock absorbing mechanism, the combination with front and rear wedge pressure transmitting means relatively movable toward and away from each other; of a centrally disposed group of relatively movable friction plates; wedge friction shoes at opposite ends of the mechanism co-operating with said plates and front and rear wedge pressure-transmitting means; and spring resistance means disposed about said plates and opposing relative approach of said shoes.

32. In a friction shock absorbing mechanism, the combination with a central group of longitudinally disposed, relatively movable friction plates; of wedge friction shoes at the opposite ends of the mechanism, said shoes being disposed at opposite sides of said group of plates; spring resistance means disposed about said plates, said last named means being interposed between the shoes at the front and rear ends of the mechanism; and wedge pressure transmitting means at opposite ends of the mechanism co-operating with said shoes.

33. In a friction shock absorbing mechanism, the combination with end followers; of a spring resistance; a plurality of longitudinally extending friction elements having longitudinally extending co-operable friction surfaces and arranged to have alternate ones of said elements slide with respect to the remaining elements, said elements being disposed within said spring resistance; and a plurality of wedge blocks at each end of said friction elements and co-operable with the latter for pressing the same into tight frictional engagement during a compression stroke, said wedge blocks and followers having co-operating sets of engaging wedge faces.

34. In a friction shock absorbing mechanism, the combination with two relatively movable end followers; of a spring resistance; a centrally disposed column composed of a plurality of longitudinally extending friction elements having friction faces engaging with each other, alternate ones of said elements being anchored to one follower and the remainder anchored to the other follower; and means at each end of said column for pressing said friction elements into tight frictional engagement with each other during a compression stroke of the mechanism, said means including a plurality of wedge elements at each end of the mechanism having wedge engagement with the corresponding adjacent follower.

35. In a friction shock absorbing mechanism, the combination with a central sectional load sustaining member composed of a plurality of oppositely movable longitudinally extending co-operative friction members; of wedging means at either end of said load sustaining member for forcing the parts thereof into close contact, said wedging means including a follower having a plurality of wedge faces thereon and a plurality of wedge shoes co-operable with the wedge faces of the follower and with the load sustaining member; and spring means interposed between the said wedging means for opposing their relative approach.

36. In a friction shock absorbing mechanism, the combination with front and rear main followers relatively movable toward each other; of a spring resistance; a centrally disposed column composed of a plurality of longitudinally extending relatively movable friction elements having faces engaging each other, said elements being adapted for movement relatively to each other by direct engagement with said followers; means for restoring said friction elements to normal position after each compression of the mechanism; and friction shoes at each end of said column having wedging engagement with said followers for pressing said elements into tight frictional engagement with each other during a compression stroke.

37. In a friction shock absorbing mechanism, the combination with front and rear follower elements, said follower elements being movable toward and away from each other; a centrally disposed group of relatively movable friction elements adapted to be engaged directly by said follower elements to effect relative movement of said friction elements; a spring resistance surrounding said group of friction elements; means for placing said friction elements under lateral pressure, including wedge means actuated by each follower upon relative approach of said followers; and wedge friction shoes co-operating with the opposite ends of said friction elements and engaging the wedge means associated with the corresponding follower element, said shoes being movable with reference to said follower element.

In witness that I claim the foregoing I have hereunto subscribed my name this 17th day of April, 1923.

STACY B. HASELTINE.